United States Patent Office 3,496,442
Patented Feb. 17, 1970

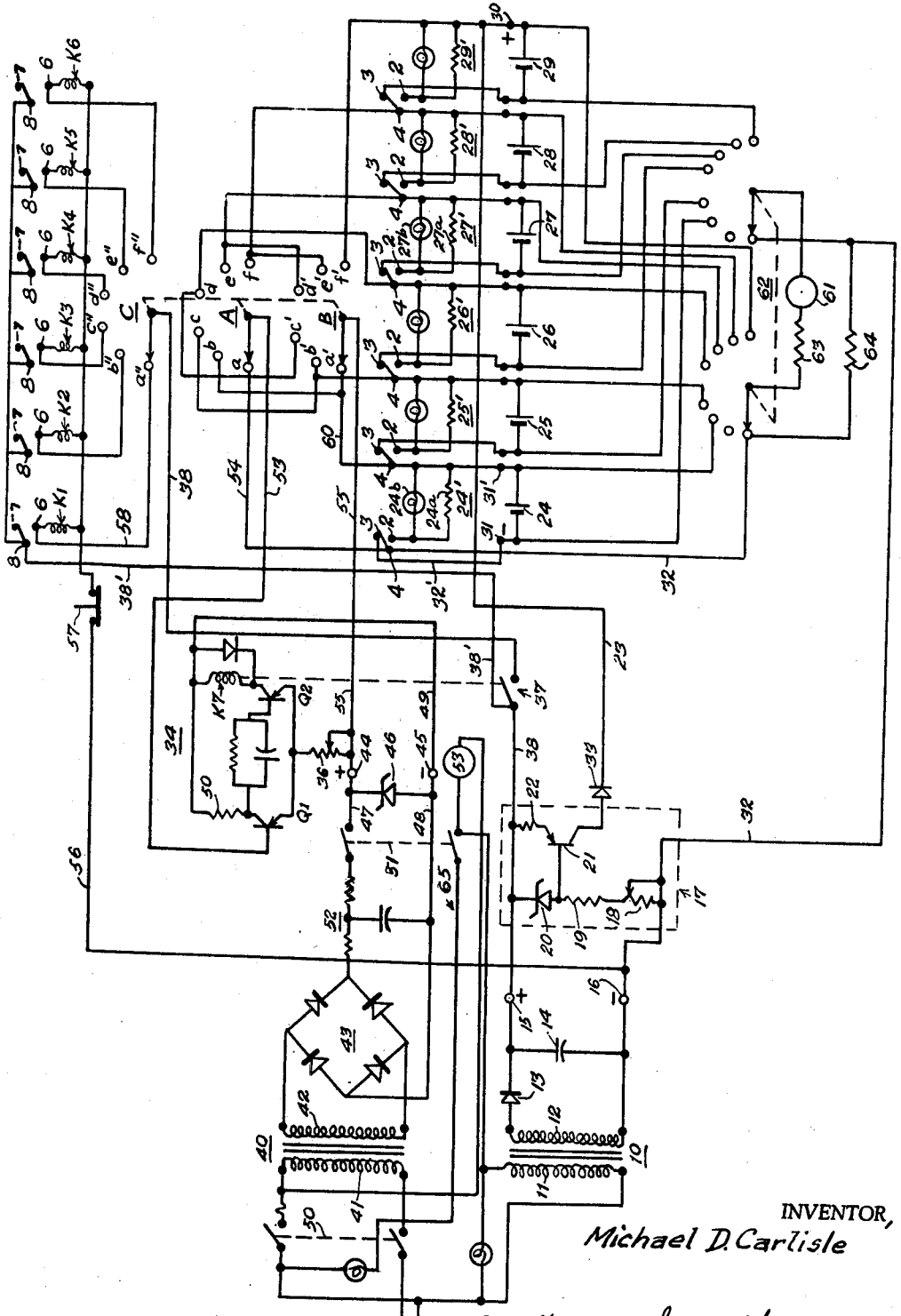

3,496,442
AUTOMATIC BATTERY CHARGER
Michael D. Carlisle, 2301 Berkley Ave.,
Las Vegas, Nev. 89101
Filed Apr. 10, 1968, Ser. No. 720,193
Int. Cl. H01m 45/04
U.S. Cl. 320—18                    6 Claims

ABSTRACT OF THE DISCLOSURE

An automatic constant current battery charger which electronically samples each battery in the charging circuit for end-point charge, electrically disconnects batteries having reached end-point charge and substitutes an equivalent load in the charging circuit for each battery electrically disconnected therefrom.

The invention described herein may be manufactured and used by or for the Government of the United States of America for governmental purposes without the payment to me of any royalty therein.

An object of the invention is a battery charger which automatically charges batteries at a constant current rate.

Another object of the invention is an automatic battery charger which electronically samples each battery in the charging circuit at predetermined periods for end-point charge voltage and electrically disconnects the battery or batteries having reached an end-point charge voltage from the charging circuit and connects an equivalent load or loads with visual indicating means therefor in the charging circuit.

The invention will be more fully understood and its objects and advantages further appreciated by referring now to the following detailed specification taken in conjunction with the accompanying drawing in the single figure of which like numerals identify like elements.

Referring now to the drawing wherein is shown a schematic diagram of a preferred embodiment of the invention, the parameters being selected for the purpose of illustration regarding the charging of silver cell batteries, a power supply 10 consisting of a transformer having its primary 11 connected to a 120 volt A.C. line and its low voltage secondary 12 provided with diode rectifier 13, filter capacitor 14 and positive and negative output terminals 15 and 16, respectively, for the purpose of energizing identical relays K1 through K6 and for providing a source of power for charging series connected cells 24 through 29 inclusive. Each said relay is provided with two double throw armatures as indicated by reference numerals 4 and 8. Contacts 2 and 3 being associated with armature 4 and contacts 7 and 6 being associated with armature 8. The constant current charging circuit 17 comprises a voltage divider connected across terminals 15-16 consisting of series connected resistors 18 and 19 and Zener diode 20 including transistor 21 having its base connected intermediate resistor 19 and Zener diode 20. The emitter of transistor 21 is connected to positive terminal 15 of power supply 10 through bias resistor 22 and its collector to positive terminal 30 of the battery of cells through blocking diode 33 by means of conductor 23. The negative terminal 31 of the battery of cells is returned to the negative terminal 16 of power supply 10 by means of conductors 32' and 32 through armature 4 and contact 3 of relay K1, assuming cell 24 has not yet reached its full charge. However, for example, where cell 24 has reached its full charge or greater, relay K1 due to the action of sensor means 34 functions resulting in armature 4 switching from contact 3 to contact 2 whereby the negative pole of cell 24 is disconnected from the negative side of the power supply 10 and dummy load 24' including visual indicating means is substituted for the cell 24 in the charging circuit. The dummy load 24' consists of a parallel connected resistor 24a and indicating lamp 24b having one terminal connected to conductor 60 which couples the terminal 31' to which the positive pole of cell 24 is connected to armature 4 of relay K2 and the other terminal thereof is connected to contact 2 of relay K1. As can be seen from the schematic, all dummy loads 24' through 29' are identical and each one is similarly connected circuitwise to the associated relays and cells and each is switched into the charging circuit in the same manner as described in conjunction with dummy load 24.

The sensor means 34 is an electronic voltage sensing circuit, a Schmitt-trigger type, the resistors, transistors and relay thereof selected to obtain optimum voltage sensing around 2.05 volt range, assuming that silver cells are in the charging circuit, within extreme temperature variations. Q1 is the transistor used as a trigger and Q2 is the transistor used to drive relay K7 which is in the collector circuit of transistor Q2. The voltage trigger level is precisely adjusted by means of adjustable resistor 36. When Schmitt-trigger sensor 34 senses a cell voltage of 2.05 or greater, relay K7 de-energizes causing its contacts 37 which are in series with conductor 38 to close whereby a positive potential is applied to the rotating arm of deck C of a three deck motor driven rotary switch. Closure of contacts 37 starts a sequence of events that is entirely synchronized with the position of the motor driven three deck rotary switch subsequently described hereinafter. Power for Schmitt-trigger sensor 34 is provided by power supply 40 which consists of a transformer having a primary 41 connected to the 120 volt A.C. line and a low voltage secondary connected to the input of a bridge rectifier 43, the positive side output of which is coupled by means of conductor 47 through the resistor components of filter 52 to positive terminal 44 and the negative side output to negative terminal 45 by means of conductor 48. A Zener diode 46 across terminals 44 and 45 provides for voltage regulation. Double pole, single throw toggle switch 51 has one set of its switch elements in series with conductor 47 and its other set in series with one leg of the 120 volt A.C. line 65 which is connected to motor 53. When toggle switch 51 is in the closed positon, power from power supply 40 is applied to the Schmitt-trigger sensor 34 and A.C. power to motor 53 which drives the three deck (A, B and C) rotary switch at the rate of one revolution per minute whereby each cell is electronically sampled or sensed once a minute in the arrangement shown in the schematic diagram.

Switching deck A of the rotary switch switches the base of trigger transistor Q1 in the Schmitt-trigger sensor 34 to each negative terminal of the series connected cells in the sequence, for example, of cell 24 through cell 29 whereupon the cycle is continuously repeated until the sensing function is cut off by means of switch 51. Considering cell 24, conductor 53 connects the base of trigger transistor Q1 to the rotating arm of switching deck A which as shown in the position in the schematic diagram is in contact with contact a thereof which is connected to armature 4 of relay K1 by means of conductor 54. Armature 4 is shown closed upon contact 3 connected to the negative pole or terminal 31 of cell 24 by means of conductor 32'. Each of the negative poles of the other cells in the charging circuit are similarly wired to their respective contacts on switching deck A through armatures 4 of their respective relays. Switching deck B of the rotary switch switches the common side of the Schmitt-trigger sensor 34 to the positive terminals of the cells at the same time and in the same sequence as switching deck A switches the base of trigger transistor Q2 to the negative terminals. In regard to the circuit connections thereof, conductor 55 connects the common side of Schmitt-trigger sensor 34 to the rotating arm of switching deck B which is shown in contact with contact $a'$ thereof. Contact $a'$ is coupled to positive terminal or pole 31' of cell 24 by means of conductor 60 to which is also connected the armature 4 of relay K2 shown closed on its associated contact 3 and which subsequently closes on its contact 2 to disconnect cell 25 from the series connected cells and substitute dummy load 25' therefor, assuming cell 25 has come up to full charge. Switching deck C of the rotary switch, rotated in synchronism with switching decks A and B, sequentially switches the positive side of power supply 10 to relays K1 through K6 through contacts 37 of relay K7. One terminal of each of the coils of relays K1 through K6 is connected to conductor 56 which is returned to the negative terminal 16 of power supply 10 and which has a reset switch 57 in series therewith. The other terminal of each of said coils is connected to its respective contact 6, each of which is connected to a corresponding contact on switching deck C. For example, contact 6 of relay K1 is connected to contact $a''$ of switching deck C by means of conductor 58. In the same manner contacts 6 of the other relays K2 through K6 are connected to their associated contacts, $b''$ through $f''$, of switching deck C. Armature 8 of each relay, K1 through K6, is connected to the positive terminal 15 of power supply 10 by means of conductors 38 and 38' so that, for instance, when relay K1 is energized, assuming cell 24 is now fully charged, armature 8 of relay K1 will close on contact 6 thereof whereby relay K1 will remain energized after the rotating arm of switching deck C has moved off contact $a''$. Relay K1, or any of relays K1 through K6 which have been energized, will remain energized due to action of latching means, not shown, until the reset switch 57 is operated. Thus it can be seen that as switching decks A, B and C are rotated in synchronism by motor 53, the cells are sequentially placed across the input of Schmitt-trigger sensor 34 by switching decks A and B and that as each cell is placed across said input its associated relay is simultaneously switched to the positive terminal of power supply 10 through contacts 37 of relay K7 by switching deck C whereby an operating potential of 28 volts may be applied to the coil or coils of the relay or relays associated with the battery or batteries that have reached full charge.

Electrical monitoring is provided by means of milliammeter 61 and manual 2-deck rotary switch 62. To measure charge current, milliammeter 61 in series with resistor 63 is switched by rotary switch 61 across a shunt resistor 64 which is in series with the cells being charged. To measure individual cell voltage both sides of milliammeter 61 including resistor 63 are switched by rotary switch 62 across the individual cells as desired.

In operation, power supply 10 supplies power for operating the relays K1 through K6 and charging current through constant charging circuit means 17 for charging the series connected cells 24 through 29. Power supply 40 powers electronic sensing means 34, a Schmitt-trigger electronic sensor. Motor 53 drives the rotary switch consisting of three switching decks A, B and C. In the Schmitt-trigger, triggering transistor Q1 is normally in the OFF state and the relay driving transistor Q2 in the ON state whereby relay K7 in the collector circuit thereof is energized. Assuming that cell 27 has reached full charge and that the rotating arms of switching decks A, B and C are now in contact with contacts $d$, $d'$ and $d''$, respectively, cell 27 is placed across the base of Q1 and common side of Schmitt-trigger 34 whereby Q1 goes into the ON state and Q2 into the OFF state whereupon relay K7 de-energizes to close its contacts 37 whereby power supply 10 energizes relay K4 whose armature 4 switches from its contact 3 to disconnect the negative pole of cell 27 from the charging circuit and to its contact 2 whereby a dummy load 27' is substituted for cell 27 and placed in the charging circuit, including pilot light 27b indicating that the cell has been fully charged. When the aforementioned arms move off contacts $d$, $d'$ and $d''$ in the above recited example, relay K7 is again energized causing its contacts 37 to open whereby power supplied to relay K4 through contacts 37 is removed. Now Q1 is again in the OFF state and Q2 in the ON state. Simultaneously with the action of armature 4, armature 8 of relay K4 which is connected directly to the positive terminal 15 of power supply 10 closes on contact 6 whereby the energization of relay K4 is maintained after the rotating arm of switching deck C moves off contact $d''$ and remains so energized until reset switch 57 is operated to open the relay power circuit whereupon the hold-in or latching means, not shown, releases the relay armature to return to its normal position.

While a preferred form of the invention has been shown and described for the purpose of illustration, it will be understood that reasonable modifications may be made in the practice of the invention.

I claim:

1. An automatic battery charger and monitor for charging a bank of series connected batteries comprising in combination, a dummy load including visual indicating means adapted to be switched in place of each charged battery of said series connected batteries, a first D.C. power supply means, a constant current charging circuit connected across said first D.C. power supply means, a blocking diode coupling the positive side of said constant current charging means and the positive terminal of said bank of series connected batteries, conductor means coupling the negative terminal of said bank of series connected batteries to negative side of said constant current charging means through relay means, a resistor in series with said conductor means, an electronic voltage sensor consisting of a transistorized Schmitt-trigger circuit, one transistor of said Schmitt-trigger circuit comprising a trigger transistor, another transistor of said Schmitt-trigger circuit comprising a relay driving transistor, a relay in the collector circuit of said relay driving transistor provided with a pair of contacts, second D.C. power supply means connected across said Schmitt-trigger circuit, said trigger transistor normally in the OFF state, said relay driving transistor normally in the ON state whereby said relay is energized and said pair of contacts are in open position, a bank of double pole, double throw relays arranged to be individually energized by said first power supply through said pair of contacts, each of said double pole, double throw relays operable in response to the switching action of said electronic voltage sensor when a related battery has reached full potential to disconnect said related battery from said constant current charging circuit and to switch a dummy load therefore into said charging circuit, switching means for sequentially switching said double pole, double throw relays across said first power supply means and synchronously therewith switching said electronic voltage sensor across each battery of said bank of series connected batteries, and means for electrically monitoring the charge current, and voltage of each of said batteries.

2. The invention in accordance with claim 1 wherein each said dummy load comprises a parallel connected resistor and pilot light.

3. The invention in accordance with claim 2 wherein a first pole of each of said double pole, double throw relays is connected to one terminal of each said batteries and normally closed on a first related contact whereby said batteries are connected in series, each said dummy load connected between a second related contact of said first pole and the opposite terminal of each said batteries whereby when one of said batteries is fully charged said first pole of the double throw, double pole relay associated therewith moves off said first related contact and closes on said second related contact disconnecting said one battery from the series connected batteries and connecting a dummy load in place thereof, the second pole of each said double pole, double throw relays connected to the positive side of said first D.C. power supply, one terminal of each coil of said double pole, double throw relays connected to the negative side of said D.C. power supply and another terminal thereof connected to a contact for cooperation with said second pole, the second pole of any of said double pole, double relays which have been energized closing on said last mentioned contact thereof whereby the energized relay is kept energized after said switching means has become disengaged therefrom.

4. The invention in accordance with claim 3 wherein said switching means comprises first, second and third deck motor driven rotary switch, each deck of said rotary switch consisting of a rotating arm and an identical number of contacts, the rotating arm of said first deck connected through said pair of contacts to the positive side of said first D.C. power supply, each said contact for cooperation with said second pole connected to a respective contact on said first deck whereby the positive side of said first D.C. power supply is consecutively connected to said coils, the rotating arm of said second deck connected to the base of said trigger transistor, a pole of one polarity of each of said batteries connected to the contacts of said second deck in the same sequence as said contacts for cooperation with said second pole are connected to contacts of said first deck, the rotating arm of said third deck connected to common side of said Schmitt-trigger, a pole of opposite polarity of each of said batteries connected to the contacts of said third deck in the same sequence as said second deck whereby said batteries are sequentially switched across the input of said Schmitt-trigger.

5. The invention in accordance with claim 4 wherein said means for electrically monitoring the charge current and the voltage of each of said batteries comprises a milliammeter and manually operated switching means, said switching means in one position placing said milliammeter in shunt with said resistor whereby the charge current reading is obtained and in other positions adapted to shunt said milliammeter across each of said batteries to observe the voltage levels thereof.

6. An automatic battery charger comprising in combination a first D.C. power supply means, a single pole, double throw relay connected across said D.C. first power supply means, a constant current charging circuit connected across said first power supply means, the positive side of said constant current charging circuit connected to the positive terminal of the battery to be charged, the negative side of said constant current charging circuit connected to said single pole normally in contact with a first contact of said single pole double throw relay, said first contact connected to the negative pole of said battery, electronic voltage sensing means consisting of a transistorized Schmitt-trigger circuit, one transistor of said Schmitt-trigger circuit comprising a trigger transistor and another transistor of said Schmitt-trigger circuit comprising a relay driving transistor, a second D.C. power supply means, said second D.C. power supply means coupled to said sensing means, a relay provided with a pair of contacts in the collector circuit of said relay driving transistor, said pair of contacts in series with said first power supply and said single pole, double throw relay, said trigger transistor normally in the OFF state, said relay driving transistor normally in the ON state whereby said relay is energized and said pair of contacts are in open position, the base of said trigger transistor connected to the negative pole of said battery through said single pole and said first contact, the common side of said Schmitt-trigger circuit connected to the positive pole of said battery, and means for visually indicating when said battery is fully charged consisting of a parallel connected resistor and pilot light having one terminal thereof connected to the positive pole of said battery and the other terminal connected to a second contact of said single pole, double throw relay, said trigger transistor going into an ON state and said relay driving transistor going into an OFF state when said battery is fully charged whereby said relay de-energizes and its pair of contacts close causing energization of said single pole double throw relay whose single pole switches from said first contact to disconnect the battery from the charging circuit to said second contact connecting said parallel connected resistor and pilot light across the constant current charging circuit.

References Cited
UNITED STATES PATENTS

| | | | |
|---|---|---|---|
| 3,100,862 | 8/1963 | Collier | 320—18 X |
| 3,278,824 | 10/1966 | Runyon | 320—18 X |
| 3,305,754 | 2/1967 | Oaks et al. | 320—18 X |
| 3,328,663 | 6/1967 | Kagan | 320—17 |
| 3,413,536 | 11/1968 | Webb | 320—17 |

W M. SHOOP, Jr., Primary Examiner

STANLEY WEINBERG, Assistant Examiner

U.S. Cl. X.R.

320—39